US010503398B2

(12) United States Patent
Leyon

(10) Patent No.: US 10,503,398 B2
(45) Date of Patent: Dec. 10, 2019

(54) PORTABLE ELECTRONIC DEVICE AND METHOD OF CONTROLLING DISPLAY OF SELECTABLE ELEMENTS

(71) Applicant: BlackBerry Limited, Waterloo (CA)

(72) Inventor: Christofer Bengt Thure Leyon, Malmö (SE)

(73) Assignee: BlackBerry Limited, Waterloo (CA)

( * ) Notice: Subject to any disclaimer, the term of this patent is extended or adjusted under 35 U.S.C. 154(b) by 175 days.

(21) Appl. No.: 14/555,431

(22) Filed: Nov. 26, 2014

(65) Prior Publication Data

US 2016/0147440 A1 May 26, 2016

(51) Int. Cl.
G06F 3/0488 (2013.01)
G06F 3/041 (2006.01)
(Continued)

(52) U.S. Cl.
CPC .......... *G06F 3/04886* (2013.01); *G06F 3/021* (2013.01); *G06F 3/041* (2013.01);
(Continued)

(58) Field of Classification Search
CPC ...... G06F 3/04886; G06F 3/021; G06F 3/041; G06F 3/0482; G06F 3/04842; G06F 3/04847
See application file for complete search history.

(56) References Cited

U.S. PATENT DOCUMENTS 8,463,315 B2 * 6/2013 Griffin ................... G06F 1/1626
455/168.1
8,959,430 B1 * 2/2015 Spivak .................... G06F 3/048
715/243
(Continued)

FOREIGN PATENT DOCUMENTS

CN 101419526 A 4/2009
CN 102053791 A 5/2011
(Continued)

OTHER PUBLICATIONS

Examiner's Report dated Sep. 8, 2016, issued on corresponding CA patent application No. 2,911,850.
(Continued)

*Primary Examiner* — Ryan F Pitaro
*Assistant Examiner* — Jeremy L Stanley
(74) *Attorney, Agent, or Firm* — Borden Ladner Gervais LLP; Todd Keeler

(57) ABSTRACT

A method of controlling display of selectable elements on a portable electronic device includes displaying a navigation bar including a plurality of selectable elements along a side of the touch-sensitive display that is adjacent to the physical keyboard. In response to entering a keyboard input mode, a plurality of keyboard keys is displayed on the touch-sensitive display, along the side that is adjacent to the physical keyboard. The keyboard keys include keys for character entry in a character entry field on the touch-sensitive display and a key to discontinue displaying the plurality of keyboard keys on the touch-sensitive display. In response to receipt of selection of the key to discontinue displaying the plurality of keyboard keys on the touch-sensitive display, display of the plurality of keyboard keys is discontinued and the navigation bar is displayed along the side that is adjacent to the physical keyboard.

10 Claims, 5 Drawing Sheets

(51) Int. Cl.
  *G06F 3/02* (2006.01)
  *G06F 3/0482* (2013.01)
  *G06F 3/0484* (2013.01)
(52) U.S. Cl.
  CPC ........ *G06F 3/0482* (2013.01); *G06F 3/04842* (2013.01); *G06F 3/04847* (2013.01)

(56) References Cited

U.S. PATENT DOCUMENTS

| | | | |
|---|---|---|---|
| 9,134,809 B1* | 9/2015 | Mak | G06F 3/0221 |
| 9,613,015 B2* | 4/2017 | Badger | G06F 3/0237 |
| 2002/0190957 A1* | 12/2002 | Lee | G06F 1/1626 |
| | | | 345/169 |
| 2003/0227745 A1* | 12/2003 | Khoo | G06F 3/0231 |
| | | | 361/679.3 |
| 2005/0012723 A1 | 1/2005 | Pallakoff | |
| 2008/0072143 A1* | 3/2008 | Assadollahi | G06F 3/0236 |
| | | | 715/261 |
| 2009/0295750 A1* | 12/2009 | Yamazaki | G06F 3/04886 |
| | | | 345/173 |
| 2010/0085312 A1* | 4/2010 | Kirkup | G06F 3/0236 |
| | | | 345/173 |
| 2010/0105438 A1* | 4/2010 | Wykes | G06F 3/0482 |
| | | | 455/566 |
| 2011/0163973 A1* | 7/2011 | Ording | G06F 3/0236 |
| | | | 345/173 |
| 2011/0221678 A1 | 9/2011 | Davydov | |
| 2011/0263298 A1 | 10/2011 | Park et al. | |
| 2012/0019446 A1* | 1/2012 | Wu | G06F 3/018 |
| | | | 345/168 |
| 2012/0146911 A1* | 6/2012 | Griffin | G06F 3/04886 |
| | | | 345/168 |
| 2013/0067385 A1* | 3/2013 | Demopoulos | G06F 3/0233 |
| | | | 715/780 |
| 2013/0076591 A1 | 3/2013 | Sirpal et al. | |
| 2013/0080962 A1* | 3/2013 | Razzaghi | G06F 3/0237 |
| | | | 715/773 |
| 2013/0080963 A1 | 3/2013 | Hong | |
| 2013/0086505 A1* | 4/2013 | de Paz | G06F 3/1438 |
| | | | 715/773 |
| 2013/0120267 A1* | 5/2013 | Pasquero | G06F 17/276 |
| | | | 345/168 |
| 2013/0285913 A1* | 10/2013 | Griffin | G06F 3/0237 |
| | | | 345/168 |
| 2013/0285926 A1* | 10/2013 | Griffin | G06F 3/04883 |
| | | | 345/173 |
| 2013/0307785 A1* | 11/2013 | Matsunaga | G08C 17/02 |
| | | | 345/169 |
| 2014/0035824 A1* | 2/2014 | Bernstein | G06F 3/02 |
| | | | 345/172 |
| 2014/0152578 A1* | 6/2014 | Kuroda | G06F 3/0221 |
| | | | 345/172 |
| 2014/0164981 A1* | 6/2014 | Colley | G06F 3/04886 |
| | | | 715/780 |
| 2014/0237356 A1* | 8/2014 | Durga | G06F 17/276 |
| | | | 715/256 |
| 2014/0245177 A1* | 8/2014 | Maklouf | G06F 3/04886 |
| | | | 715/752 |
| 2014/0317547 A1* | 10/2014 | Bi | G06F 3/0482 |
| | | | 715/773 |
| 2014/0379325 A1* | 12/2014 | Houache | G06F 3/0237 |
| | | | 704/9 |
| 2015/0277751 A1* | 10/2015 | Manmualiya | G06F 3/04883 |
| | | | 715/773 |
| 2016/0124926 A1* | 5/2016 | Fallah | G06F 3/0486 |
| | | | 715/271 |
| 2016/0291923 A1* | 10/2016 | Sirpal | G06F 3/1438 |

FOREIGN PATENT DOCUMENTS

| | | |
|---|---|---|
| CN | 102591417 A | 7/2012 |
| CN | 103733162 A | 4/2014 |
| WO | 2014094416 A1 | 6/2014 |

OTHER PUBLICATIONS

Printout of "How to avoid soft keyboard pushing up my layout?", retrieved on Oct. 29, 2014 from http:///:stackoverflow.com/questions/5516216/how-to-avoid-soft-keyboard-pushing-up-my-layout.
Printout of "10 tips & tricks for getting more out of the LG G3", pp. 1-5, retrieved on Oct. 29, 2014 from http://www.gizmag.com/lg-g3-tips-tricks-tweaks/33479/.
Extended European Search Report dated Jun. 1, 2016, issued on corresponding EP patent application No. 15195213.2.
Canadian Patent Application No. 2,911,850, Office Action dated Aug. 14, 2017.
Chinese Patent Application No. 201510833753.5, Office Action dated Mar. 6, 2018—English Translation not Available.
European Patent Application No. 15195213.2, Office Action dated Jul. 17, 2018.

* cited by examiner

US 10,503,398 B2

PORTABLE ELECTRONIC DEVICE AND METHOD OF CONTROLLING DISPLAY OF SELECTABLE ELEMENTS

FIELD OF TECHNOLOGY

The present disclosure relates to electronic devices including, but not limited to, portable electronic devices and controlling the display of selectable elements on a touch-sensitive display.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. A touch-sensitive input device, such as a touch-screen display, is particularly useful on handheld devices, which are small and may have limited space for user input and output.

Improvements in electronic devices with touch-sensitive displays are desirable.

BRIEF DESCRIPTION OF THE DRAWINGS

Embodiments of the present disclosure will now be described, by way of example only, with reference to the attached figures, in which.

DETAILED DESCRIPTION

Figure 1:
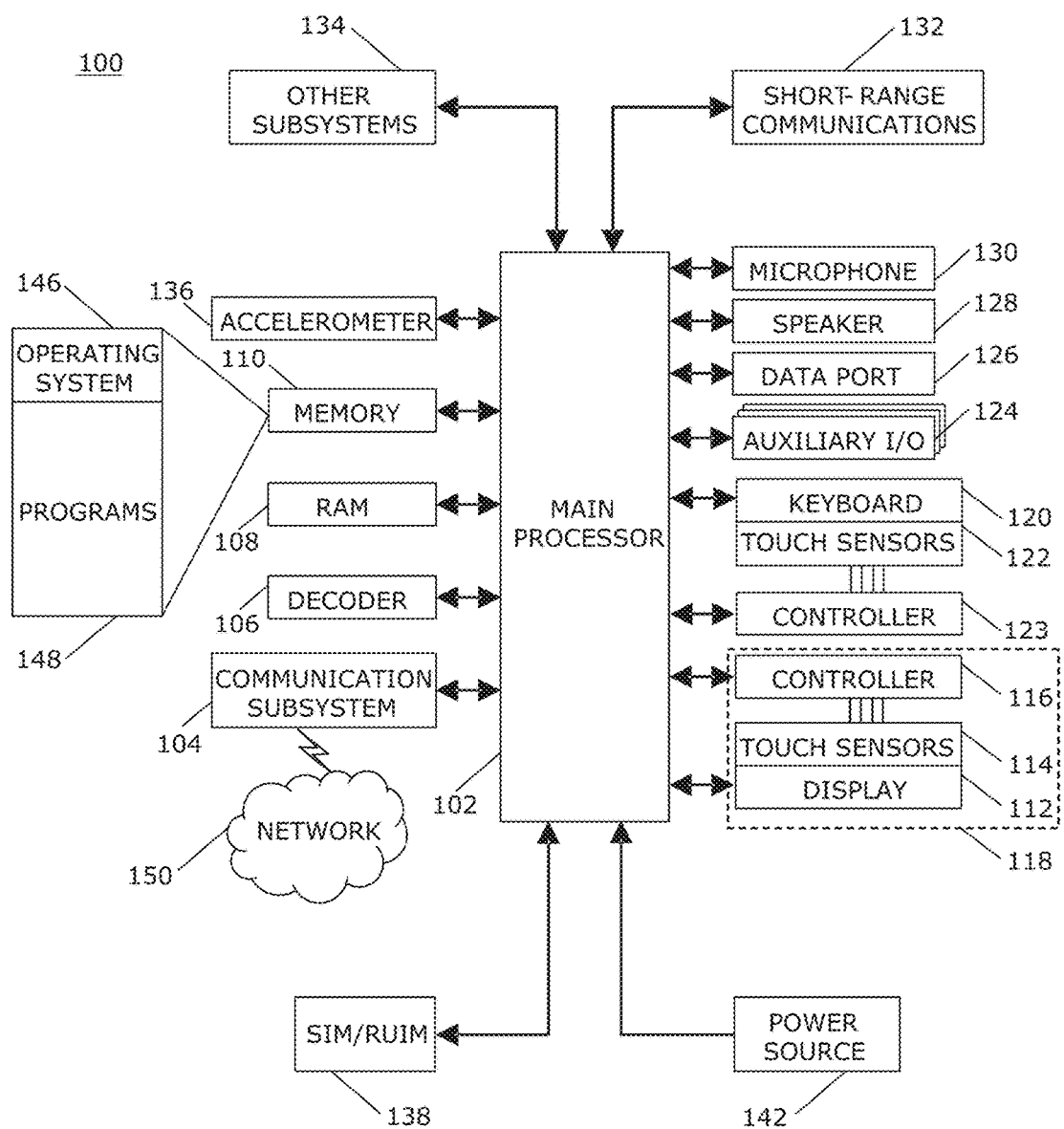
FIG. 1 is a block diagram of an example of a portable electronic device in accordance with the disclosure.

The following describes an electronic device and a method of controlling display of selectable elements on a portable electronic device. The method includes displaying a navigation bar including a plurality of selectable elements along a side of the touch-sensitive display that is adjacent to the physical keyboard. In response to entering a keyboard input mode, a row including a plurality of keyboard keys is displayed on the touch-sensitive display, along the side that is adjacent to the physical keyboard. The keyboard keys include keys for character entry in a data entry field on the touch-sensitive display and a key to discontinue displaying the plurality of keyboard keys on the touch-sensitive display. In response to receipt of selection of the key to discontinue displaying the plurality of keyboard keys on the touch-sensitive display, display of the plurality of keyboard keys is discontinued and the navigation bar is displayed along the side that is adjacent to the physical keyboard.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a physical keyboard 120, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The physical keyboard 120 includes a plurality of mechanical keys that include mechanical switches or contacts for input to the electronic device 100 when a mechanical key of the keyboard is depressed by a sufficient amount to oppose a bias of the mechanical key. In this example, touch sensors 122 are disposed on the keyboard and the touch sensors 122 are coupled to a controller 123. Thus, in addition to depression of the mechanical keys of the keyboard 120 for input to the portable electronic device 100, touches on the mechanical keys are also detected for input to the processor 102.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch on a touch-sensitive display 118 may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected by the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch on the touch-sensitive display 118, including a gesture, may be associated with the display area, the non-display area, or both areas. The touch sensors may extend across substantially the entire non-display area or may be disposed in only part of the non-display area.

Figure 2:
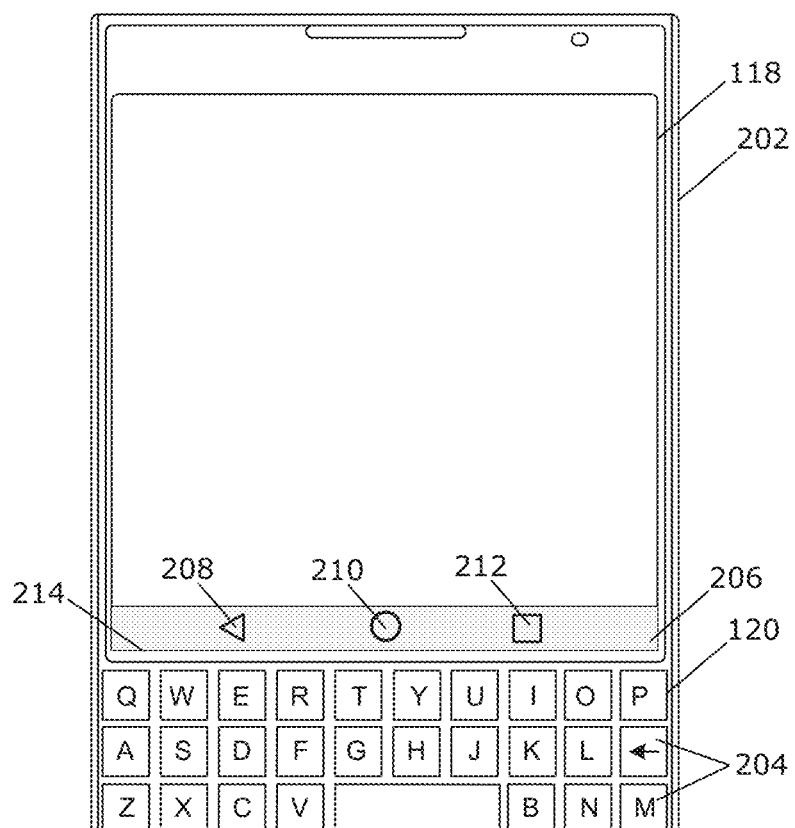
FIG. 2 is a front view of an example of a portable electronic device including selectable elements displayed on a touch-sensitive display of the portable electronic device.

A front view of an example of the electronic device 100 is shown in FIG. 2. The electronic device 100 includes a housing 202 in which the touch-sensitive display 118 is disposed. The housing 202 is utilized to enclose components such as the components shown in FIG. 1.

The mechanical keyboard 120 is disposed below the touch-sensitive display 118 in the orientation illustrated in FIG. 2. The mechanical keyboard 120 includes a plurality of keys 204. Each one of the keys 204 of the keyboard is associated with only a single, respective character such that only a single associated character is entered utilizing any one key 204. In the example shown in FIG. 2, each key is associated with a single character of the alphabet, a space, or a return function. Although the keyboard shown in FIG. 2 is a QWERTY keyboard, other keyboard layouts may be successfully implemented, such as an AZERTY keyboard, a QWERTZ keyboard, or any other suitable keyboard. The keyboard 120 includes only three rows of keys 204 to reduce the amount of space utilized for the keyboard 120 by comparison to a four row keyboard. The three row keyboard does not include a shift key, punctuation, or keys for numerical character entry.

Information may be displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth.

As illustrated in FIG. 2, a navigation bar 206 is displayed on the touch-sensitive display 118. The navigation bar 206 includes a plurality of selectable elements or features in a bar or row that extends along a side of the touch-sensitive display 118 that is adjacent to or closest to the physical keyboard 120. In the orientation of the portable electronic device illustrated in FIG. 2, the navigation bar 206 is displayed along the bottom side 214 of the touch-sensitive display 118. The selectable elements in the navigation bar 206 include, for example, a back key 208, a home key 210, and a recent applications key 212. Each of the selectable elements is selectable, for example, by a touch on an area at which the selectable option is displayed on the touch-sensitive display 118. The back key 208, is selectable to navigate back to a previous screen, such as a previous application. The home key 210 is selectable to return to a home screen that includes icons for selection to launch associated applications. The recent applications key 212 is selectable to display a representation of applications or application screens that were recently used. These applications may include, for example, applications or application screens on the portable electronic device 100 that were used but not closed, applications that were used or application screens that were displayed within a period of time, or a set number of most recently used applications or displayed application screens.

Figure 3:
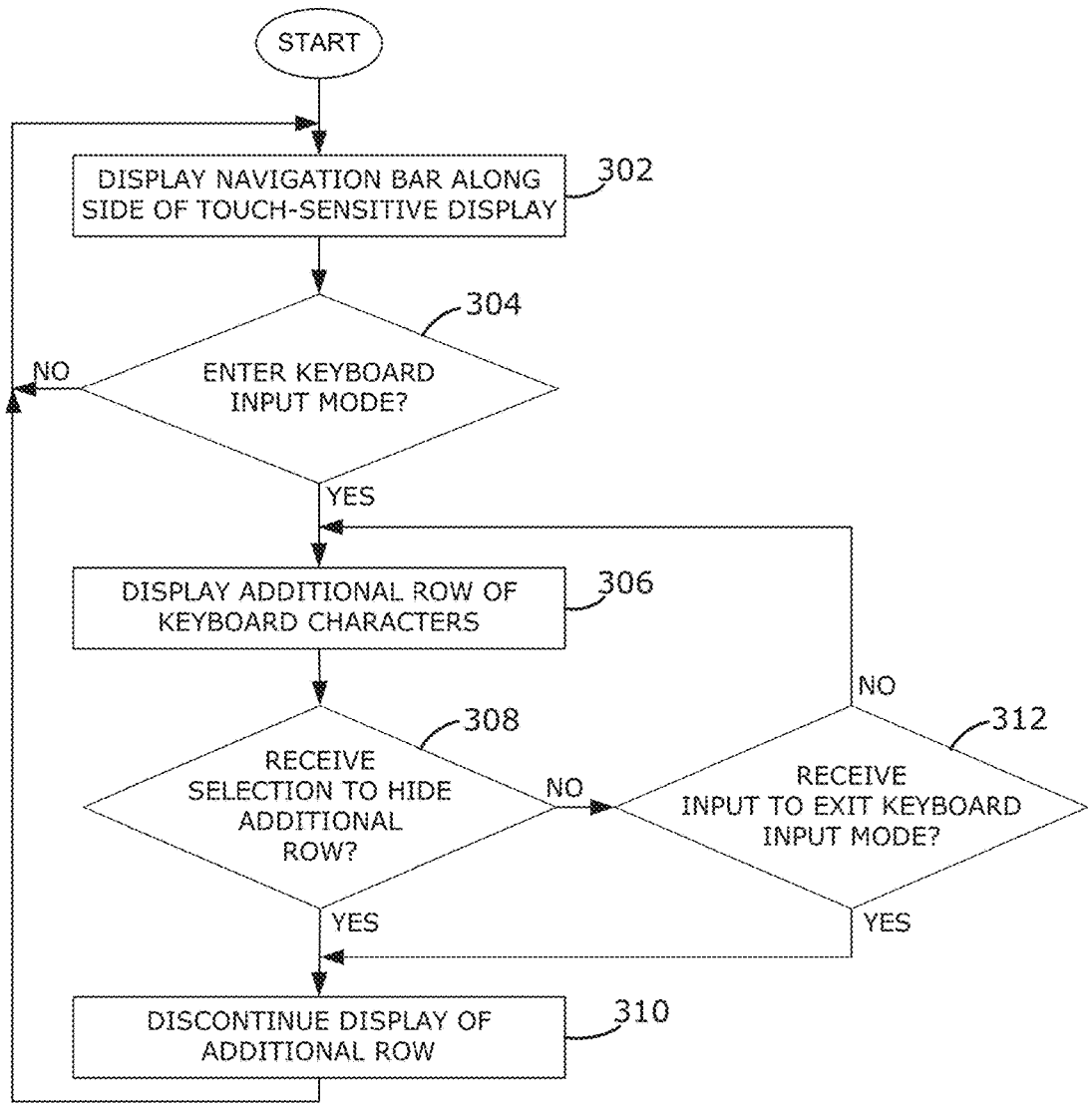
FIG. 3 is a flowchart illustrating a method of controlling display of selectable elements on the portable electronic device of FIG. 1 in accordance with the disclosure.

A flowchart illustrating a method of controlling the display of selectable elements is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The navigation bar is displayed at 302, along the side of the touch-sensitive display 118 that is closest to the physical keyboard 120. The navigation bar is displayed at any time that the touch-sensitive display 118 of the portable electronic device 100 is on or powered up and, during which time, the portable electronic device 100 is not in a keyboard input mode. Thus, when the physical keyboard 120 is not being utilized to enter characters such as alphabetical characters, the navigation bar is displayed. For example, when displaying content such as photos or videos, webpage content, received emails, calendar events, or other content, the navigation bar is displayed.

In response to entering a keyboard input mode at 304, the process continues at 306. The portable electronic device 100 enters a keyboard input mode for the input of characters into a data entry field on the touch-sensitive display. For example, the portable electronic device 100 may enter a keyboard input mode in response to selection of a data entry field on a webpage, in response to entering a field in an email message, in response to selecting a cell in a spreadsheet, in response to selection of a field in a document in an word processing application, and so forth. Such selections may be effected by a touch on the touch-sensitive display. Thus, when the keyboard is utilized for entry of characters, the portable electronic device 100 enters the keyboard entry mode.

An additional row of keys is displayed along the side of the touch-sensitive display 118 that is closest to the physical keyboard 120 at 306. As described above with reference to FIG. 2, the keyboard includes only three rows of keys 204 and each key is utilized for entry of only a single, respective character. Thus, punctuation or numerical characters are not entered utilizing the physical keyboard 120. The additional row of keys displayed along the side of the touch-sensitive display 118 in response to entry into the keyboard input mode, is utilized to enter punctuation or to display numerical characters for number entry.

Figure 4:
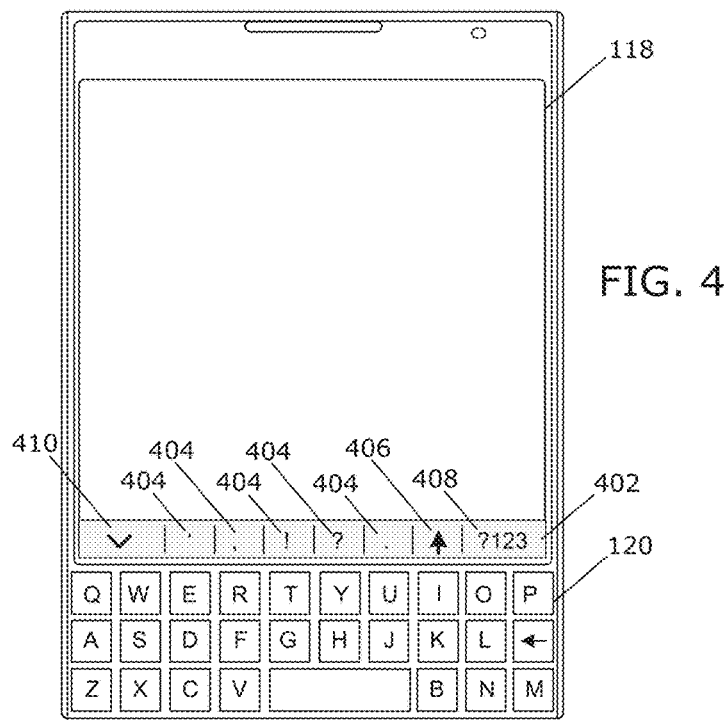
FIG. 4 through FIG. 7 illustrate examples of selectable elements displayed on a touch-sensitive display of a portable electronic device in accordance with the present disclosure.

An example of an additional row of keys 402 is illustrated in FIG. 4. The additional row of keys 402 includes a plurality of keyboard keys for character entry into a data entry field on the touch-sensitive display. Each of the keys of the additional row of keys 402 is selectable by a touch on the key or on an area associated with the key. Such keys include, for example, punctuation keys 404, a shift key 406, and a numerical key 408. The punctuation keys 404 are selectable to enter punctuation into a field displayed on the touch-sensitive display 118. The shift key 406 is selectable, for example, to capitalize alphabetical characters that are entered utilizing the physical keyboard 120. The numerical key 408 is selectable to display numerical characters that are selectable for entry into the field displayed on the touch-sensitive display 118 of the portable electronic device 100. The numeral characters may be displayed, for example, by displaying a further row or rows of keys including numerical keys, or by replacing the additional row of keys 402.

The additional row of keys 402 also includes a key 410 to hide the plurality of keyboard keys on the touch-sensitive display 118. The key 410 to hide the plurality of keyboard keys is selectable.

Figure 5:
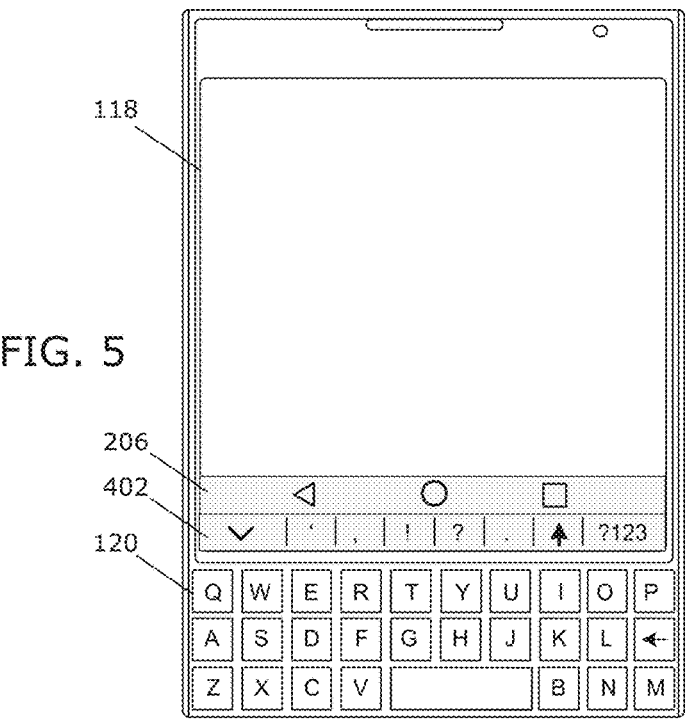

Display of the navigation bar is discontinued at 306 to display the additional row of keys 402 as the additional row of keys 402 replaces the navigation bar in the example of FIG. 4. Alternatively, the navigation bar 206 may be displaced such that display of the navigation bar 206 continues as the navigation bar 206 is displayed above the additional row of keys 402 and the additional row of keys 402 is displayed between the navigation bar 206 and the physical keyboard 120, as shown in the example of FIG. 5. Displaying the navigation bar 306 to display the additional row of keys 402 adjacent to the touch-sensitive display 118 facilitates selection of keys such as the punctuation key, and reduces the chance of inadvertently selecting a key from the navigation bar 206.

Reference is again made to FIG. 3 as well as the examples of FIG. 2 and FIG. 4. In response to receipt of a selection of the key 410 to hide the plurality of keyboard keys on the touch-sensitive display 118 at 308, the process continues at 310.

Display of the additional row of keys 402 is discontinued at 310 and the navigation bar 206 is returned to the side of the touch-sensitive display 118 that is adjacent to the physical keyboard 118. Thus, the navigation bar 206 is again displayed at 302 as shown in FIG. 2. The portable electronic device 100 may again enter the keyboard entry mode at 304, for example, when a touch is detected on the touch-sensitive display 118, at a location that corresponds with a data entry field.

If selection of the key 410 to hide the plurality of keyboard keys on the touch-sensitive display 118 is not received at 308, the process continues to 312. In response to receiving input to exit the keyboard input mode, the process continues at 310 where the display of the additional row of keys 402 is discontinued and the navigation bar 206 is returned to the location along the side of the touch-sensitive display 118 that is closest to the physical keyboard 118. The input to exit the keyboard input mode may be an input to exit the application, to display another screen or execute another application, or any other suitable input. In the example of FIG. 5, the input to exit the keyboard input mode may be receipt of selection of any one of the keys of the navigation bar 206.

Figure 6:
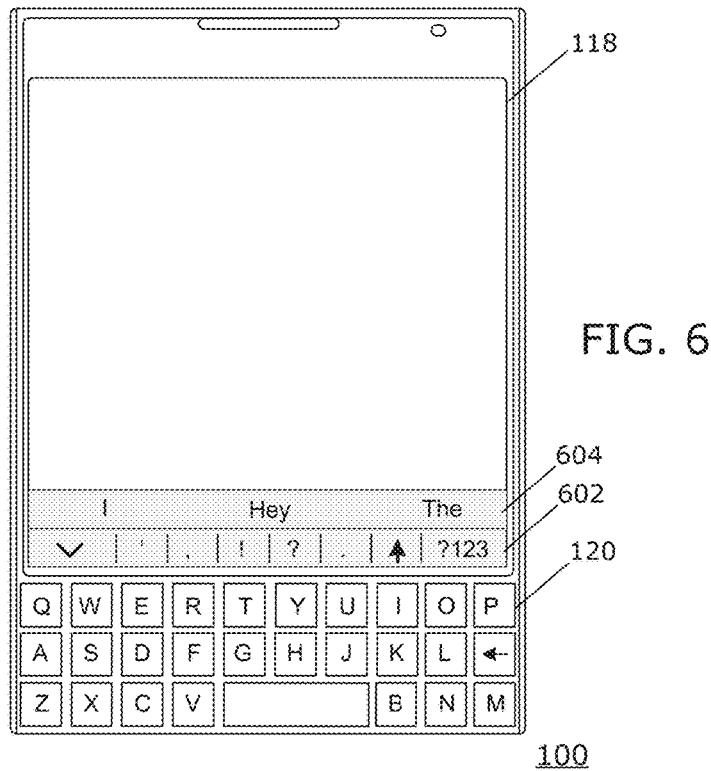

Reference is made to FIG. 6 with continued reference to FIG. 3 and to FIG. 2 to describe another example of a method of displaying selectable elements on a touch-sensitive display 118. In this example, the navigation bar 206 is displayed at 302, along the side of the touch-sensitive display 118 that is closest to the physical keyboard 120. In response to entering a keyboard input mode at 304, the process continues at 306.

An additional row of keys 602 is displayed along the side of the touch-sensitive display 118 that is closest to the physical keyboard 120 at 306. The row of keys 602 is similar to the row of keys 402 and is therefore not described again herein. In this example, however, selectable character strings 604 are also displayed. The selectable character strings 604 are displayed in a row 606 adjacent to the additional row of keys 402 such that the additional row of keys 402 is disposed between the selectable character strings 604 and the physical keyboard 120.

The selectable character strings 604 are suggested character strings. For example, when no character in a string is entered, the selectable character strings may be identified and displayed based on frequently entered character strings and based on previously entered character strings or context. When a character is entered in a string, candidate objects in reference data that have at least an initial portion or characters that match the character string are identified. The reference data is searchable and may be utilized as part of, for example, a predictive text application. The reference data may include different types of linguistic objects such as dictionary entries, contact data records stored in a contacts database and acronyms, for example. The predictive text application may modify the reference data to add objects when an object, such as a word or set of characters, that is not already included, is entered by the user. The objects identified may be ordered based on criteria such as frequency of use, previously entered word(s), recently entered word(s), alphabetical position, or context, such as an active application, for example. Ordering of the matching candidate objects may be performed as the candidate objects in reference data are identified or following identification of all of the matching candidate objects.

Candidate objects that are identified are displayed on the touch-sensitive display 118 as selectable character strings 604. The selectable character strings 604 may be displayed in the order determined. Depending on the number of candidate objects identified, some candidate objects may be displayed as selectable character strings 604 while others are not displayed. For example, the first three candidate objects in the order determined based on the criteria may be displayed as selectable character strings 604. Other suitable numbers of selectable character strings 604 may be displayed.

Each of the selectable character strings 604 is selectable utilizing the touch-sensitive display 118. When a touch is detected on the touch-sensitive display 118, at a location associated with a selectable character string 604, that selectable character string 604 is selected and entered into a data entry field on the touch-sensitive display 118.

Figure 7:
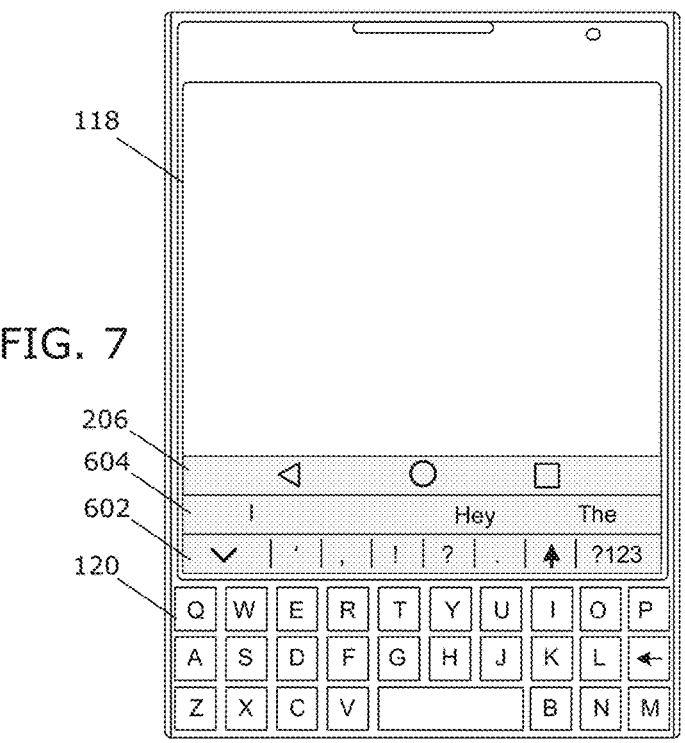

Rather than replacing the navigation bar, the additional row of keys 602 and the selectable character strings 604 may alternatively displace the navigation bar 206 such that the navigation bar 206 is displayed above the additional row of keys 602 and the selectable character strings 604, as illustrated in FIG. 7. Thus, the selectable character strings 604 and the additional row of keys 602 are both displayed between the navigation bar 206 and the physical keyboard 120.

Advantageously, a navigation bar may be replaced or displaced by an additional row of keys that are displayed on the touch-sensitive display such that the navigation bar is not disposed between the physical keyboard and the additional row of keys, reducing the chance of erroneously selecting a selectable element of the navigation bar when attempting to select a character that is not selectable utilizing the physical keyboard. Utilizing an additional row of keys facilitates the reduction is size of the physical keyboard as the physical keyboard may be smaller, for example, because fewer characters are displayed on the mechanical keys and because only three rows of keys are utilized. The remaining keys, which may be used less frequently, are selectively displayed on the touch-sensitive display.

The scope of the claims should not be limited by the preferred embodiments set forth in the examples, but should be given the broadest interpretation consistent with the description as a whole.

What is claimed is:

1. A method of controlling display of selectable elements on a portable electronic device including a physical keyboard and a touch-sensitive display, the method comprising:
   displaying a navigation bar including a plurality of selectable elements on the touch-sensitive display, wherein the navigation bar is displayed along a side of the touch-sensitive display that is adjacent to the physical keyboard;
   in response to receipt of selection of a character entry field displayed on the touch-sensitive display, entering a keyboard input mode and displaying a plurality of keyboard keys in a first row and selectable suggested character strings in a second row on the touch-sensitive display, along the side that is adjacent to the physical keyboard, the plurality of keyboard keys including keys for character entry that, in response to selection of one of the keys for character entry, result in entry of the corresponding character in a character entry field on the touch-sensitive display, such that the navigation bar is displayed adjacent the physical keyboard prior to receipt of selection of the character entry field, and the plurality of keyboard keys and the selectable suggested character strings adjacent to the plurality of keyboard keys are displayed adjacent the physical keyboard on the touch-sensitive display after receipt of the selection of the character entry field;

wherein displaying the plurality of keyboard keys in the first row comprises displaying number keys for entry of numerical characters that are not selectable utilizing the physical keyboard, the number keys in the first row including respective keys associated with each one of numerical characters 0 through 9;

wherein displaying the plurality of keyboard keys comprises displacing the navigation bar such that display of the navigation bar continues and the plurality of keyboard keys in the first row are displayed between the navigation bar and the physical keyboard and the selectable suggested character strings in the second row are displayed between the navigation bar and the plurality of keyboard keys;

in response to receipt of selection of a key to discontinue displaying the plurality of keyboard keys on the touch-sensitive display, discontinuing displaying the plurality of keyboard keys on the touch-sensitive display and the selectable suggested character strings and displaying the navigation bar along the side that is adjacent to the physical keyboard.

2. The method according to claim 1, comprising, in response to receipt of an input to exit the keyboard input mode when the plurality of keyboard keys is displayed, discontinuing displaying the plurality of keyboard keys on the touch-sensitive display and displaying the navigation bar along the side that is adjacent to the physical keyboard.

3. The method according to claim 1, wherein displaying the plurality of keyboard keys comprises displaying a shift key to perform a shift function which shift function is not selectable utilizing the physical keyboard.

4. The method according to claim 3, wherein displaying the plurality of keyboard keys comprises displaying punctuation marks for selection, which punctuation marks are not selectable utilizing the physical keyboard.

5. A non-transitory computer-readable storage medium having computer-readable code executable by at least one processor of the portable electronic device to:

display a navigation bar including a plurality of selectable elements on a touch-sensitive display of the portable electronic device, wherein the navigation bar is displayed along a side of the touch-sensitive display that is adjacent to a physical keyboard;

in response to receipt of selection of a character entry field displayed on the touch-sensitive display, enter a keyboard input mode and display a plurality of keyboard keys in a first row and selectable suggested character strings in a second row on the touch-sensitive display, along the side that is adjacent to the physical keyboard, the plurality of keyboard keys including keys for character entry that, in response to selection of one of the keys for character entry, result in entry of the corresponding character in a character entry field on the touch-sensitive display, such that the navigation bar is displayed adjacent the physical keyboard prior to receipt of selection of the character entry field, and the plurality of keyboard keys and the selectable suggested character strings adjacent to the plurality of keyboard keys are displayed adjacent the physical keyboard on the touch-sensitive display after receipt of the selection of the character entry field;

wherein displaying the plurality of keyboard keys in the first row comprises displaying number keys for entry of numerical characters that are not selectable utilizing the physical keyboard, the number keys in the first row including respective keys associated with each one of numerical characters 0 through 9;

wherein the plurality of keyboard keys displace the navigation bar such that display of the navigation bar continues and the plurality of keyboard keys in the first row are displayed between the navigation bar and the physical keyboard and the selectable suggested character strings in the second row are displayed between the navigation bar and the plurality of keyboard keys;

in response to receipt of selection of a key to discontinue displaying the plurality of keyboard keys on the touch-sensitive display, discontinue displaying the plurality of keyboard keys on the touch-sensitive display and the selectable suggested character strings and displaying the navigation bar along the side that is adjacent to the physical keyboard.

6. A portable electronic device comprising:

a physical keyboard for selection of characters when in a keyboard input mode;

a touch-sensitive display for displaying information thereon, including the characters selected when in the keyboard input mode;

a processor coupled to the physical keyboard and to the touch-sensitive display and programmed to:

display a navigation bar including a plurality of selectable elements on the touch-sensitive display, wherein the navigation bar is displayed along a side of the touch-sensitive display that is adjacent to the physical keyboard;

in response to receipt of selection of a character entry field displayed on the touch-sensitive display, enter a keyboard input mode and display a plurality of keyboard keys in a first row and selectable suggested character strings in a second row on the touch-sensitive display, along the side that is adjacent to the physical keyboard, the plurality of keyboard keys including keys for character entry that, in response to selection of one of the keys for character entry, result in entry of the corresponding character in a character entry field on the touch-sensitive display, such that the navigation bar is displayed adjacent the physical keyboard prior to receipt of selection of the character entry field, and the plurality of keyboard keys and the selectable suggested character strings adjacent to the plurality of keyboard keys are displayed adjacent the physical keyboard on the touch-sensitive display after receipt of the selection of the character entry field;

wherein displaying the plurality of keyboard keys in the first row comprises displaying number keys for entry of numerical characters that are not selectable utilizing the physical keyboard, the number keys in the first row including respective keys associated with each one of numerical characters 0 through 9;

wherein the plurality of keyboard keys displace the navigation bar such that display of the navigation bar continues and the plurality of keyboard keys in the first row are displayed between the navigation bar and the physical keyboard and the selectable suggested character strings in the second row are displayed between the navigation bar and the plurality of keyboard keys;

in response to receipt of selection of a key to discontinue displaying the plurality of keyboard keys on the touch-sensitive display, discontinue displaying the plurality of keyboard keys on the touch-sensitive display and the selectable suggested character strings and displaying the navigation bar along the side that is adjacent to the physical keyboard.

7. The portable electronic device according to claim 6, wherein the processor is programmed to, in response to receipt of an input to exit the keyboard input mode when the plurality of keyboard keys is displayed, discontinue displaying the plurality of keyboard keys on the touch-sensitive display and displaying the navigation bar along the side that is adjacent to the physical keyboard.

8. The portable electronic device according to claim 6, wherein the plurality of keyboard keys displayed on the touch-sensitive display include a shift key to perform a shift function, and wherein the shift function is not selectable utilizing the physical keyboard.

9. The portable electronic device according to claim 8, wherein the plurality of keyboard keys displayed on the touch-sensitive display include punctuation marks for selection, which punctuation marks are not selectable utilizing the physical keyboard.

10. The portable electronic device according to claim 8, wherein each key of the physical keyboard is associated with a respective single character such that only the respective single character is entered utilizing any key.

* * * * *